US009752722B2

(12) United States Patent
Farnes et al.

(10) Patent No.: US 9,752,722 B2
(45) Date of Patent: Sep. 5, 2017

(54) DISPLAY MOUNTING APPARATUS

(71) Applicant: Rosemount Aerospace, Inc., Burnsville, MN (US)

(72) Inventors: Brian Farnes, Warroad, MN (US); Matthew Tschann, Burnsville, MN (US)

(73) Assignee: ROSEMOUNT AEROSPACE, INC., Burnsville, MN (US)

( * ) Notice: Subject to any disclaimer, the term of this patent is extended or adjusted under 35 U.S.C. 154(b) by 0 days.

(21) Appl. No.: 15/244,388

(22) Filed: Aug. 23, 2016

(65) Prior Publication Data
US 2016/0356416 A1    Dec. 8, 2016

Related U.S. Application Data

(62) Division of application No. 14/717,201, filed on May 20, 2015, now Pat. No. 9,446,854.
(Continued)

(51) Int. Cl.
*A47F 5/00* (2006.01)
*F16M 13/02* (2006.01)
(Continued)

(52) U.S. Cl.
CPC ............. *F16M 13/02* (2013.01); *B64D 45/00* (2013.01); *E05D 3/022* (2013.01); *E05D 7/1005* (2013.01);
(Continued)

(58) Field of Classification Search
CPC ................. F16M 13/02; F16M 13/022; F16M 2200/028; B64D 45/00
See application file for complete search history.

(56) References Cited

U.S. PATENT DOCUMENTS 2,500,048 A    3/1950    Stoiber
4,763,151 A    8/1988    Klinger
(Continued)

FOREIGN PATENT DOCUMENTS

EP    2639489    9/2013
EP    2896567    7/2015

OTHER PUBLICATIONS

EP Application No. 15168126.9 Office Action, Issued Nov. 4, 2016, 2 pages.
(Continued)

*Primary Examiner* — Amy Sterling
(74) *Attorney, Agent, or Firm* — Cantor Colburn LLP

(57) ABSTRACT

According to one aspect, a method of installing a display mounting apparatus in a vehicle is provided. A base mount member of the display mounting apparatus is coupled to a surface of the vehicle. The base mount member includes a pair of pivot attachment holes. An angular position of a pivot support member is adjusted. The pivot support member includes an upper mounting surface and a locking pin passage, where the pivot support member is coupled to the base mount member by a pivot pin that passes through the pivot attachment holes. A lower surface of an upper mount member is positioned proximate the upper mounting surface to align a pair of locking pin holes in the upper mount member with the locking pin passage. A locking pin is engaged through the pair of locking pin holes in the upper mount member and through the locking pin passage.

17 Claims, 7 Drawing Sheets

Related U.S. Application Data

(60) Provisional application No. 62/000,724, filed on May 20, 2014.

(51) Int. Cl.
| | | |
|---|---|---|
| *B64D 45/00* | (2006.01) | |
| *E05D 3/02* | (2006.01) | |
| *E05D 7/10* | (2006.01) | |
| *F16M 11/04* | (2006.01) | |
| *F16M 11/10* | (2006.01) | |
| *F16M 13/00* | (2006.01) | |
| *F16M 11/20* | (2006.01) | |
| *F16C 11/04* | (2006.01) | |

(52) U.S. Cl.
CPC ........... *F16C 11/04* (2013.01); *F16M 11/041* (2013.01); *F16M 11/10* (2013.01); *F16M 11/2028* (2013.01); *F16M 13/00* (2013.01); *F16M 13/022* (2013.01); *B64D 2045/0075* (2013.01); *E05D 2007/1027* (2013.01); *F16M 2200/024* (2013.01); *F16M 2200/028* (2013.01); *Y10T 29/49828* (2015.01)

(56) References Cited

U.S. PATENT DOCUMENTS

| | | | |
|---|---|---|---|
| 5,769,369 | A | 6/1998 | Meinel |
| 6,588,719 | B1 | 7/2003 | Tubach |
| 7,000,878 | B2 * | 2/2006 | Lin ........................ F16M 11/08 248/276.1 |
| 7,686,250 | B2 | 3/2010 | Fortes et al. |
| 8,231,081 | B2 | 7/2012 | Fortes et al. |
| 8,308,114 | B2 | 11/2012 | Debuhr et al. |
| 9,416,912 | B2 * | 8/2016 | Grziwok ............ F16M 11/2014 |
| 2011/0084106 | A1 | 4/2011 | Bopp et al. |
| 2013/0327912 | A1 * | 12/2013 | Yoshida ............... F16M 13/022 248/289.11 |
| 2014/0063750 | A1 | 3/2014 | Mau et al. |
| 2015/0336682 | A1 | 11/2015 | Farnes et al. |

OTHER PUBLICATIONS

EP Application No. 15168126.9 Extended European Search Report, Issued Oct. 23, 2015, 5 pages.

* cited by examiner

DISPLAY MOUNTING APPARATUS

CROSS-REFERENCE TO RELATED APPLICATIONS

This application is a divisional application of and claims priority from U.S. application Ser. No. 14/717,201 filed May 20, 2015, which claims the benefit of U.S. Provisional Application Ser. No. 62/000,724 filed May 20, 2014, the entire contents of which are incorporated herein by reference.

BACKGROUND OF THE INVENTION

The subject matter disclosed herein relates to a mounting apparatus. More specifically, the subject disclosure relates to a pivoting display mounting apparatus that enables display removal without using tools.

In an aircraft cockpit, a flight crew can access information electronically using an electronic flight bag (EFB). The EFB typically includes reference materials stored as electronic documents or interactive applications. Examples of reference materials include an aircraft operating manual, a flight crew operating manual, and navigational charts. Other information that may be available to through an EFB includes aviation data and fuel calculations. EFBs can be implemented as special-purpose computers or as general purpose computing devices with EFB-specific software installed therein.

Some aircraft include EFBs incorporated into the cockpit as an integrated, non-portal device. In other aircraft, EFBs are portable devices that must be secured during flight crew use. Installing an EFB in a fixed position may result in a degraded viewing experience depending upon glare from various light sources and differences in height of flight crew members as different flight crews share an aircraft over a period of time. EFBs may require periodic updates with new data files or application programs. Where on-board programming is not available for the EFB, it must be physically removed to install updates. Portable EFBs typically support removal from a secured position, but special tools may be needed to secure and remove EFBs from an aircraft.

BRIEF DESCRIPTION OF THE INVENTION

According to an aspect, a method of installing a display mounting apparatus in a vehicle is provided. The method includes coupling a base mount member of the display mounting apparatus to a surface of the vehicle. The base mount member includes a pair of pivot attachment holes. An angular position of a pivot support member of the display mounting apparatus is adjusted. The pivot support member includes an upper mounting surface and a locking pin passage, where the pivot support member is coupled to the base mount member by a pivot pin that passes through the pair of pivot attachment holes, where the upper mounting surface of the pivot support member is substantially flat and cross shaped. A lower surface of an upper mount member of the display mounting apparatus is positioned proximate the upper mounting surface of the pivot support member to align a pair of locking pin holes in the upper mount member with the locking pin passage of the pivot support member. A locking pin is engaged through the pair of locking pin holes in the upper mount member and through the locking pin passage of the pivot support member.

According to another aspect, a method of installing a display mounting apparatus in a vehicle is provided. The method includes coupling a base mount member of the display mounting apparatus to a surface of the vehicle. The base mount member includes a pair of pivot attachment holes. An angular position of a pivot support member of the display mounting apparatus is adjusted. The pivot support member includes an upper mounting surface and a locking pin passage, where the pivot support member is coupled to the base mount member by a pivot pin that passes through the pair of pivot attachment holes. A lower surface of an upper mount member of the display mounting apparatus is positioned proximate the upper mounting surface of the pivot support member to align a pair of locking pin holes in the upper mount member with the locking pin passage of the pivot support member. A locking pin is engaged through the pair of locking pin holes in the upper mount member and through the locking pin passage of the pivot support member, where the locking pin is tethered to the base mount member at a tether attachment block.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In an exemplary embodiment, a display mounting apparatus is provided that includes separable mount members. A base mount member can be fastened to a surface of a vehicle, such as on a surface in a cockpit of an aircraft. A pivot support member is coupled by a pivot pin to the base mount member. The pivot support member pivots or tilts about the pivot pin relative to the stationary base mount member. An upper mount member can be secured to an electronic flight bag (EFB) as a display. The EFB may be a special-purpose computer with mounting holes that can be directly coupled to the upper mount member. Alternatively, the EFB can be a general-purpose computer, such as a tablet computer, that includes one or more EFB application programs. When the EFB does not include mounting holes that are directly compatible with the upper mount member, an adapter can be used to couple the EFB to the upper mount member. The upper mount member can be secured to the pivot support member by a locking pin. The locking pin may pass through a pair of locking pin holes in the upper mount member and through a locking pin passage of the pivot support member when the locking pin holes are positioned at opposite ends of the locking pin passage. The locking pin may include T-handle and a plunger operable to articulate one or more locking balls in the locking pin. An operator can depress the plunger to release the one or more locking balls from a locked position in the locking pin, such that the locking pin can be removed. Thus, once the base mount member is attached to a surface of a vehicle, an operator can connect or remove, by hand without using any tools, the upper mount member to/from the pivot support member of the display mounting apparatus while the EFB is secured to the upper mount member.

Figure 1:
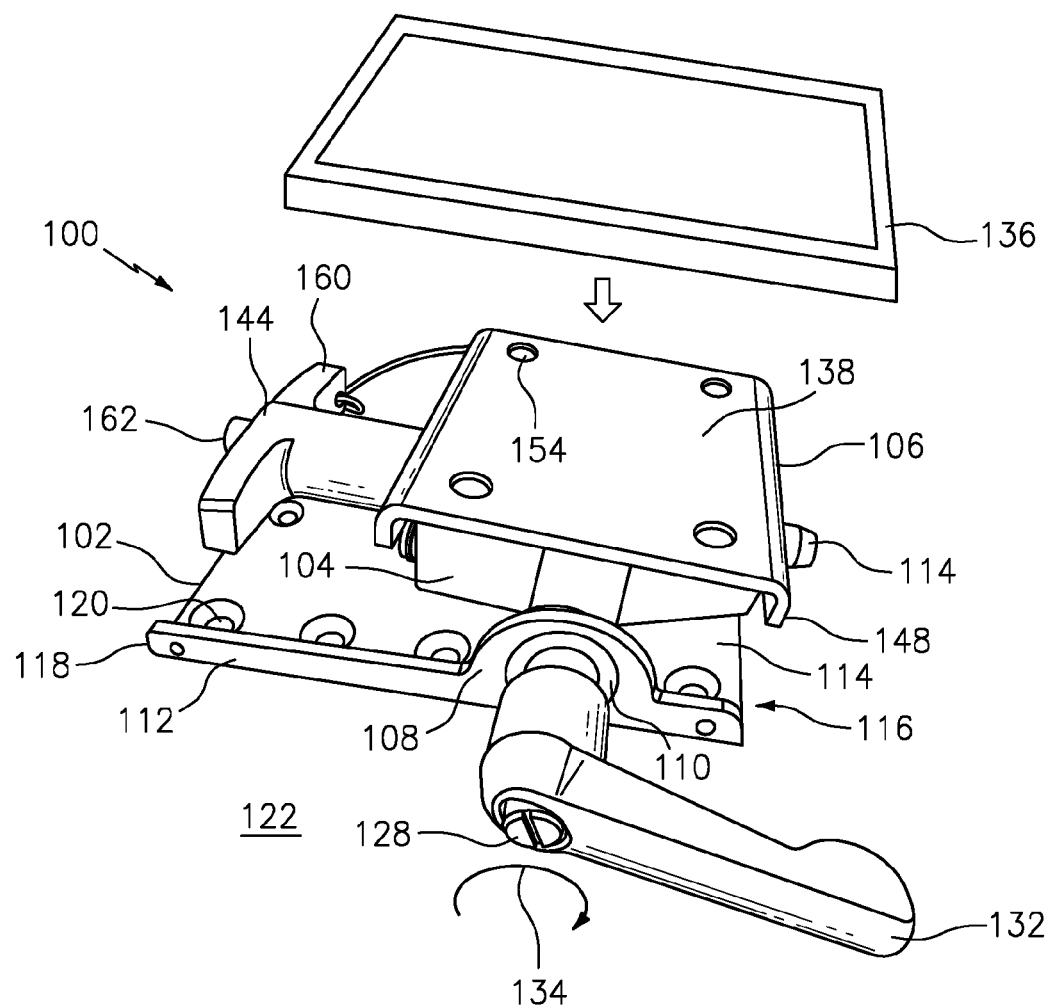
FIG. 1 is a perspective view of a display mounting apparatus according to an embodiment.
Figure 2:
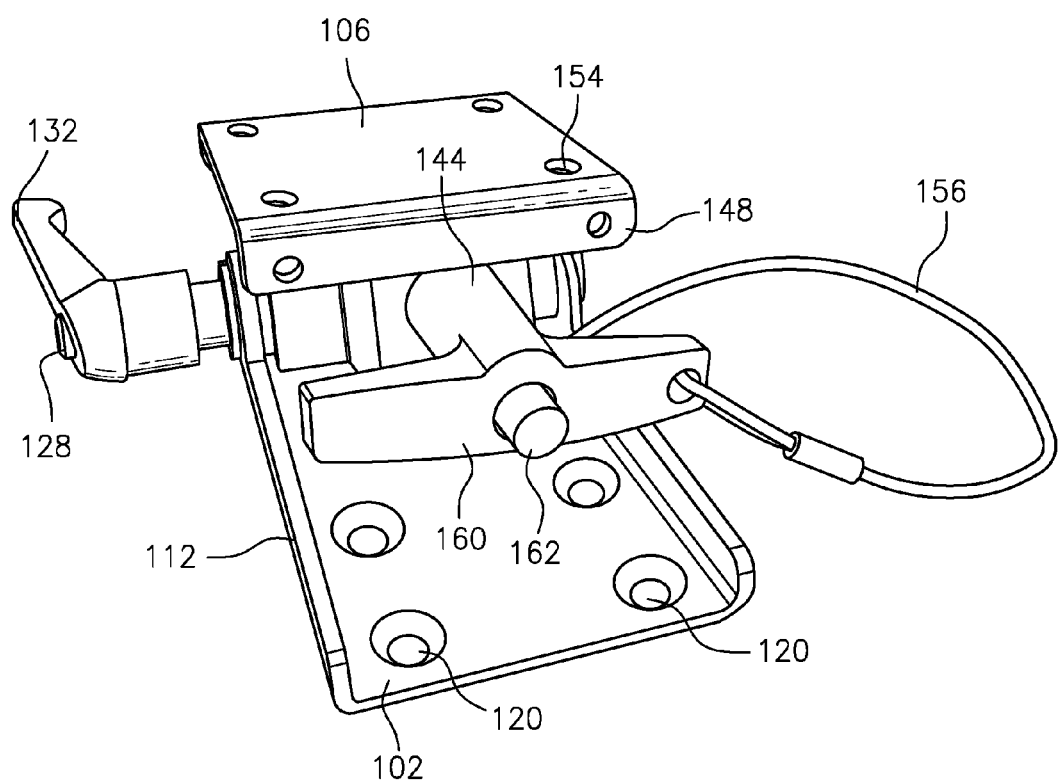
FIG. 2 is another perspective view of the display mounting apparatus according to an embodiment.

Turning now to the figures, FIGS. 1-6 depict perspective views of a display mounting apparatus 100 in assembled and disassembled states according to an embodiment. As can be seen in FIG. 1, the display mounting apparatus 100 includes a base mount member 102, a pivot support member 104, and an upper mount member 106. The base mount member 102 includes a pair of pivot coupling lobes 108, where each of the pivot coupling lobes 108 includes a pivot attachment hole 110 such that the base mount member 102 includes a pair of the pivot attachment holes 110. The pivot coupling lobes 108 may extend from sidewalls 112 of the base mount member 102, where the sidewalls 112 are substantially perpendicular to an upper surface 114 of the base mount member 102. The base mount member 102 has a first end 116 and a second end 118 that is opposite the first end 116. The pair of pivot coupling lobes 108 is offset closer to the first end 116 than to the second end 118 of the base mount member 102, i.e., non-centered. The base mount member 102 also includes a plurality of fastener holes 120 to secure the display mounting apparatus 100 to a surface 122 of a vehicle using a plurality of fasteners (not depicted). The surface 122 of the vehicle may be a cockpit of an aircraft, such as cockpit 702 of vehicle 700 of FIG. 7.

Figure 3:
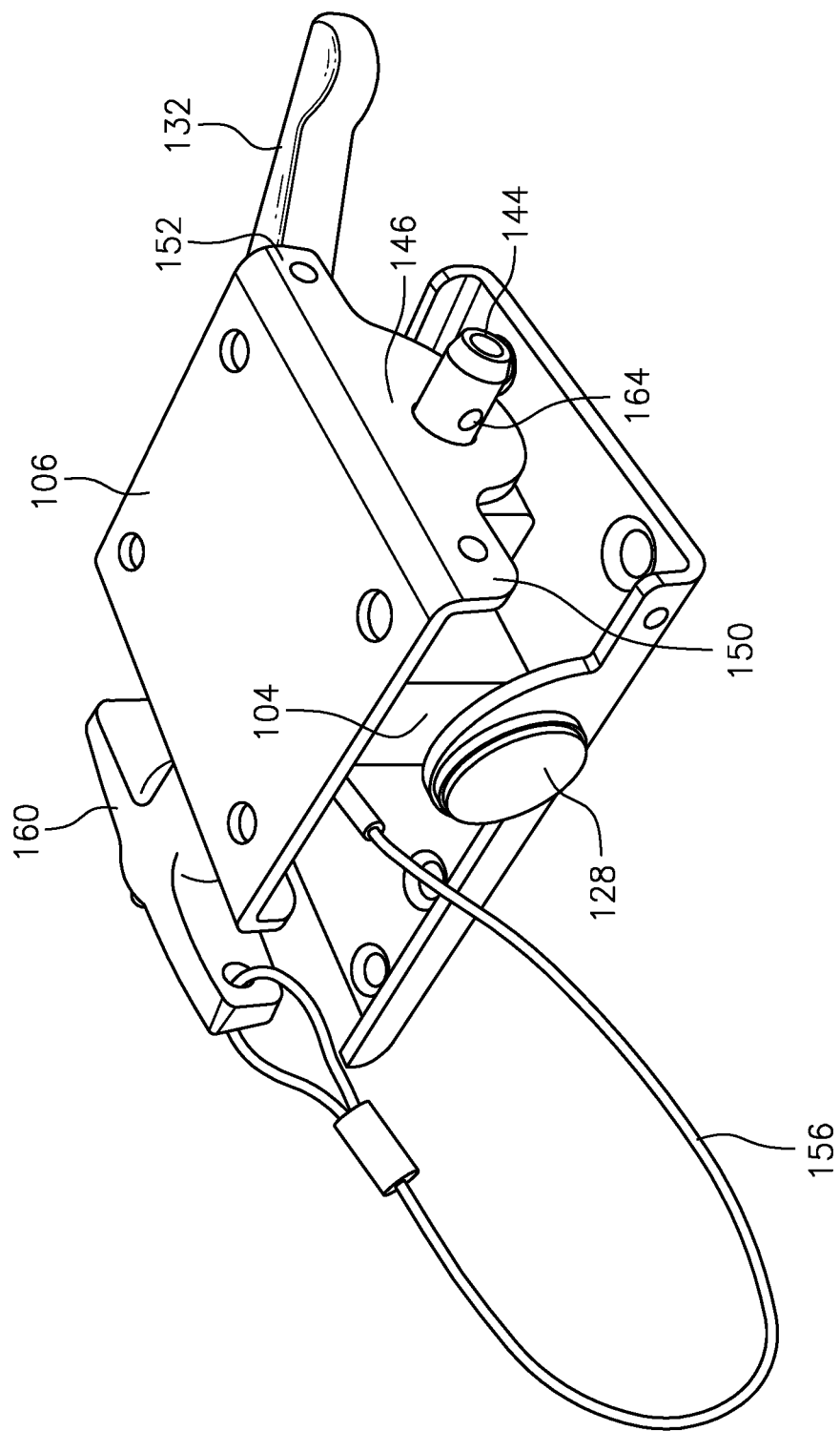
FIG. 3 is another perspective view of the display mounting apparatus according to an embodiment.
Figure 4:
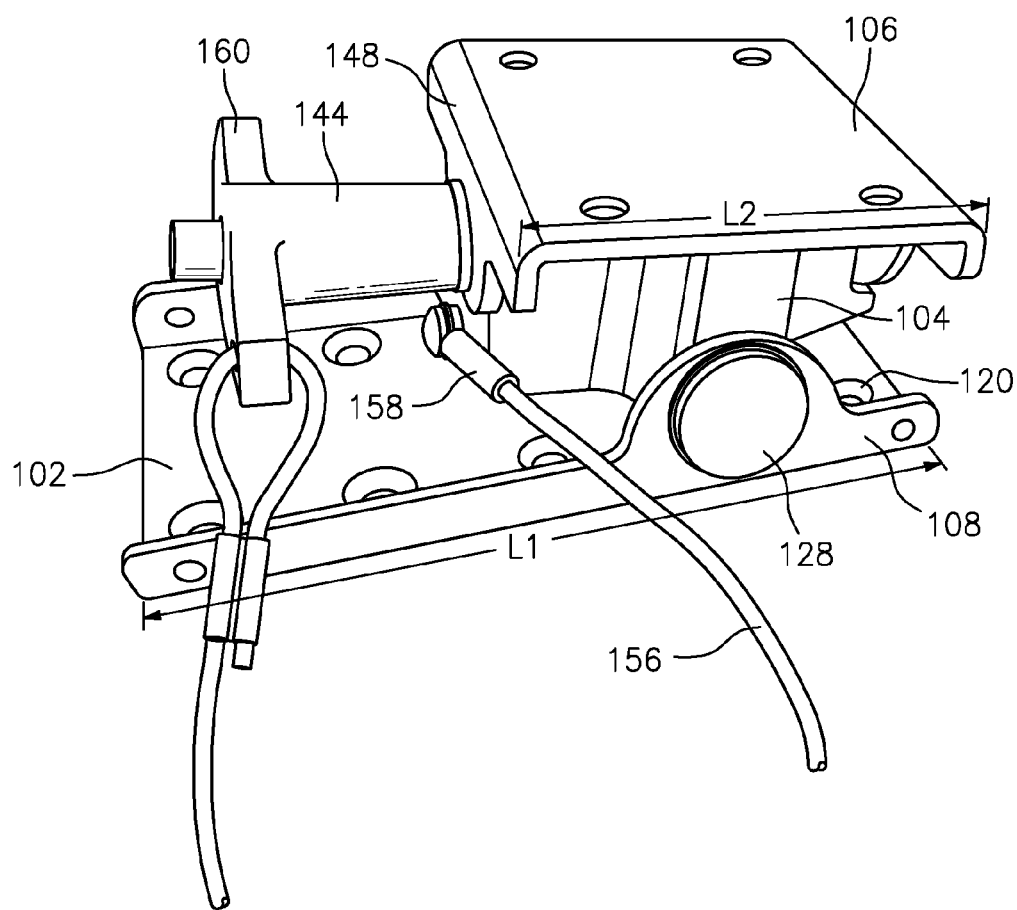
FIG. 4 is another perspective view of the display mounting apparatus according to an embodiment.
Figure 5:
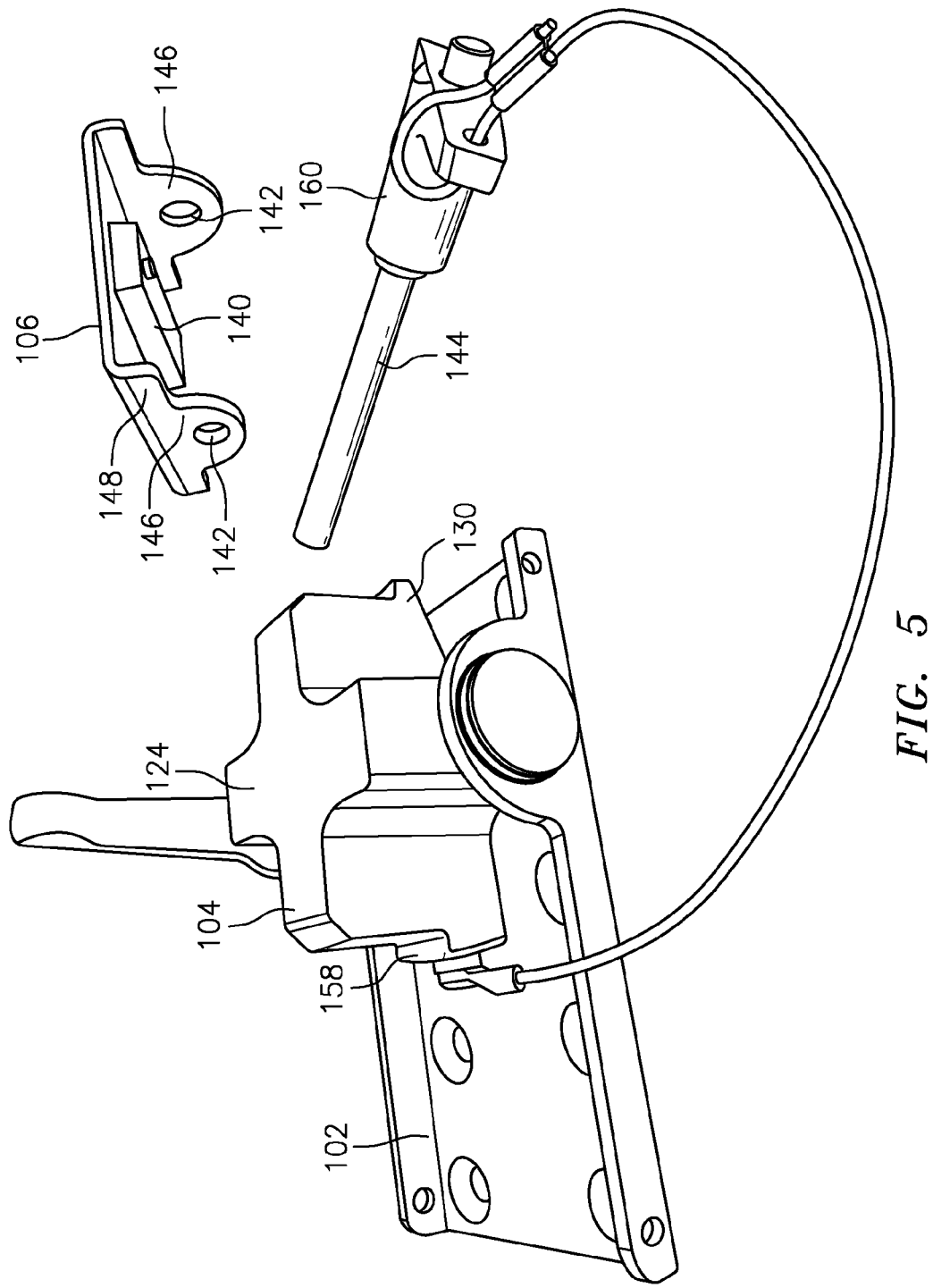
FIG. 5 is a perspective view of the display mounting apparatus in a disassembled state according to an embodiment.
Figure 6:
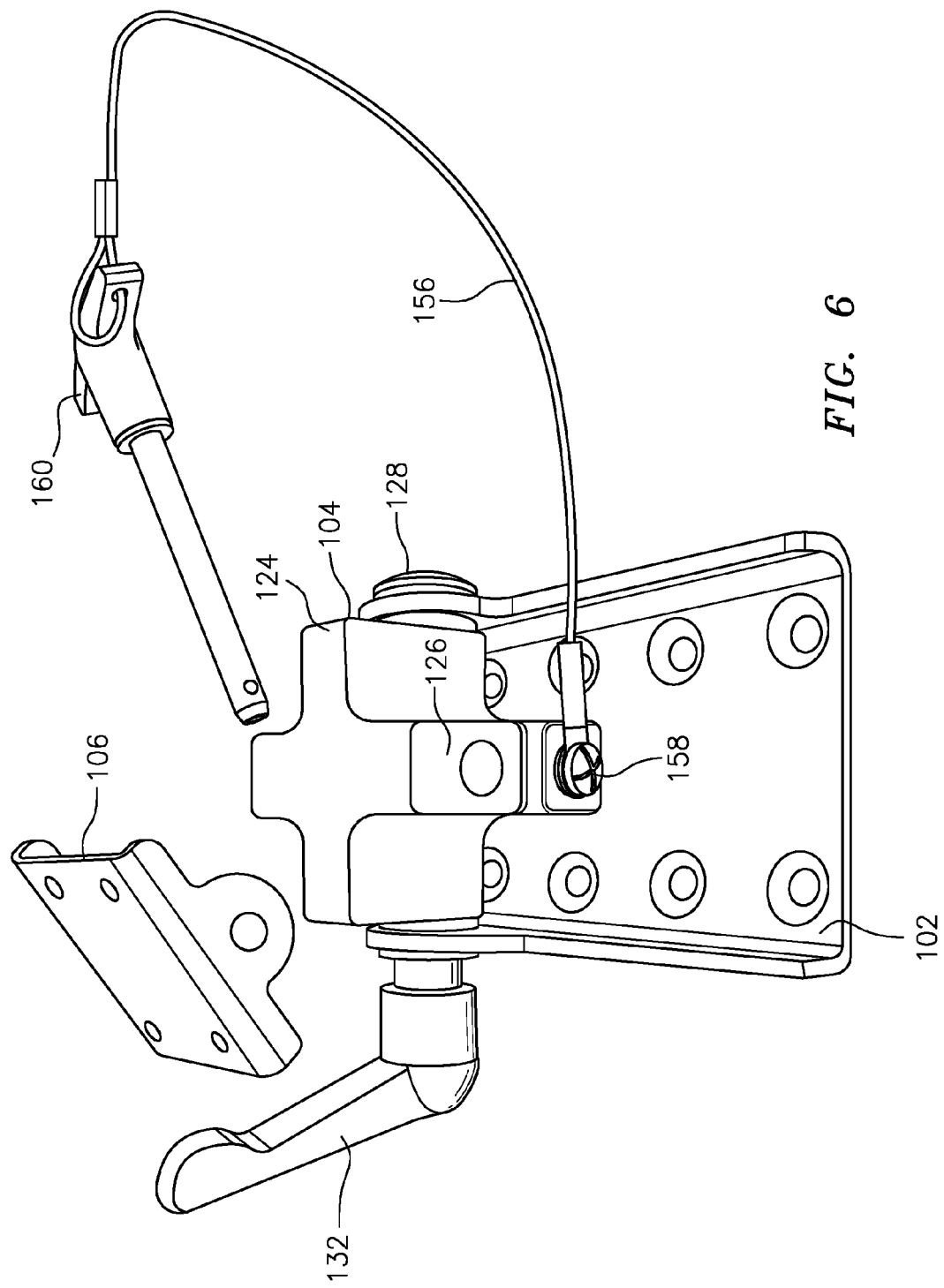
FIG. 6 is another perspective view of the display mounting apparatus in the disassembled state according to an embodiment.

With continued reference to FIGS. 1-6, the pivot support member 104 includes an upper mounting surface 124 and a locking pin passage 126, as best seen in FIGS. 5 and 6. The pivot support member 104 is coupled to the base mount member 102 by a pivot pin 128 that passes through the pair of pivot attachment holes 110. The upper mounting surface 124 of the pivot support member 104 is substantially flat and cross shaped (e.g., "+"-shaped or "X"-shaped depending on the viewing angle). The pivot support member 104 also includes one or more angled lower surfaces 130, as best seen in FIG. 5. The one of more angled lower surfaces 130 can limit rotation of the pivot support member 104 relative to the base mount member 102. The pivot pin 128 may be a ratcheting pivot pin that includes a locking handle 132 to enable inboard and outboard tilting of the pivot support member 104 at a plurality of discrete positions. For example, when the locking handle 132 is in a released or unlocked state, the pivot pin 128 can be manually rotated to change an angular position 134 of the pivot support member 104 and then locked in place. When the upper mount member 106 is coupled to the pivot support member 104, the change in angular position 134 results in tilting the upper mount member 106 and an EFB 136 secured to the upper mount member 106. Inboard tilting may be defined as movement that would tilt the EFB 136 toward a user of the EFB 136, and outboard tilting may be defined as movement that would tilt the EFB 136 away from a user of the EFB 136. The EFB 136 may be a special-purpose computer or a general-purpose computer, such as a tablet computer, that includes one or more EFB application programs and a display.

In an embodiment, the upper mount member 106 includes a display mounting surface 138, a lower surface 140, and a pair of locking pin holes 142 arranged to engage a locking pin 144 that passes through the pair of locking pin holes 142 and through the locking pin passage 126 of the pivot support member 104 when the upper mounting surface 124 of the pivot support member 104 is positioned proximate to the lower surface 140 of the upper mount member 106, as best seen in FIGS. 1 and 5. The upper mount member 106 further includes a pair of locking pin engagement lobes 146, where each of the locking pin engagement lobes 146 includes one of the locking pin holes 142. The locking pin engagement lobes 146 may extend from sidewalls 148 of the upper mount member 106, where the sidewalls 148 are substantially perpendicular to the lower surface 140 of the upper mount member 106. The upper mount member 106 has a first end 150 and a second end 152 opposite the first end 150. The pair of locking pin engagement lobes 146 is substantially centered between the first end 150 and the second end 152 of the upper mount member 106, as best seen in FIG. 3. The display mounting surface 138 of the upper mount member 106 can be secured to the EFB 136 of FIG. 1. A plurality of fastener holes 154 on the upper mount member 106 may be used to secure the upper mount member 106 directly to the EFB 136 or to an intermediate adapter (not depicted) between the upper mount member 106 and the EFB 136.

In comparing the base mount member 102 to the upper mount member 106, it can be seen that the base mount member 102 is inverted, rotated by about 90 degrees, and extended in length relative to the upper mount member 106. For example, a length L1 of the base mount member 102 is greater than a length L2 of the upper mount member 106, as best seen in FIG. 4. Additionally, the base mount member 102 may include a greater number of fastener holes 120 than a number of fastener holes 154 in the upper mount member 106.

The locking pin 144 can be tethered by a tether 156 to the base mount member 102 at a tether attachment block 158. The tether attachment block 158 may also act as a pivot stop that limits rotation of the pivot support member 104. The locking pin 144 can include a T-handle 160 and a plunger 162 operable to articulate one or more locking balls 164 in the locking pin 144. The tether 156 may also be coupled to the T-handle 160 of the locking pin 144. The tether 156 can prevent the locking pin 144 from being misplaced when removing the upper mount member 106 from the pivot support member 104.

Figure 7:
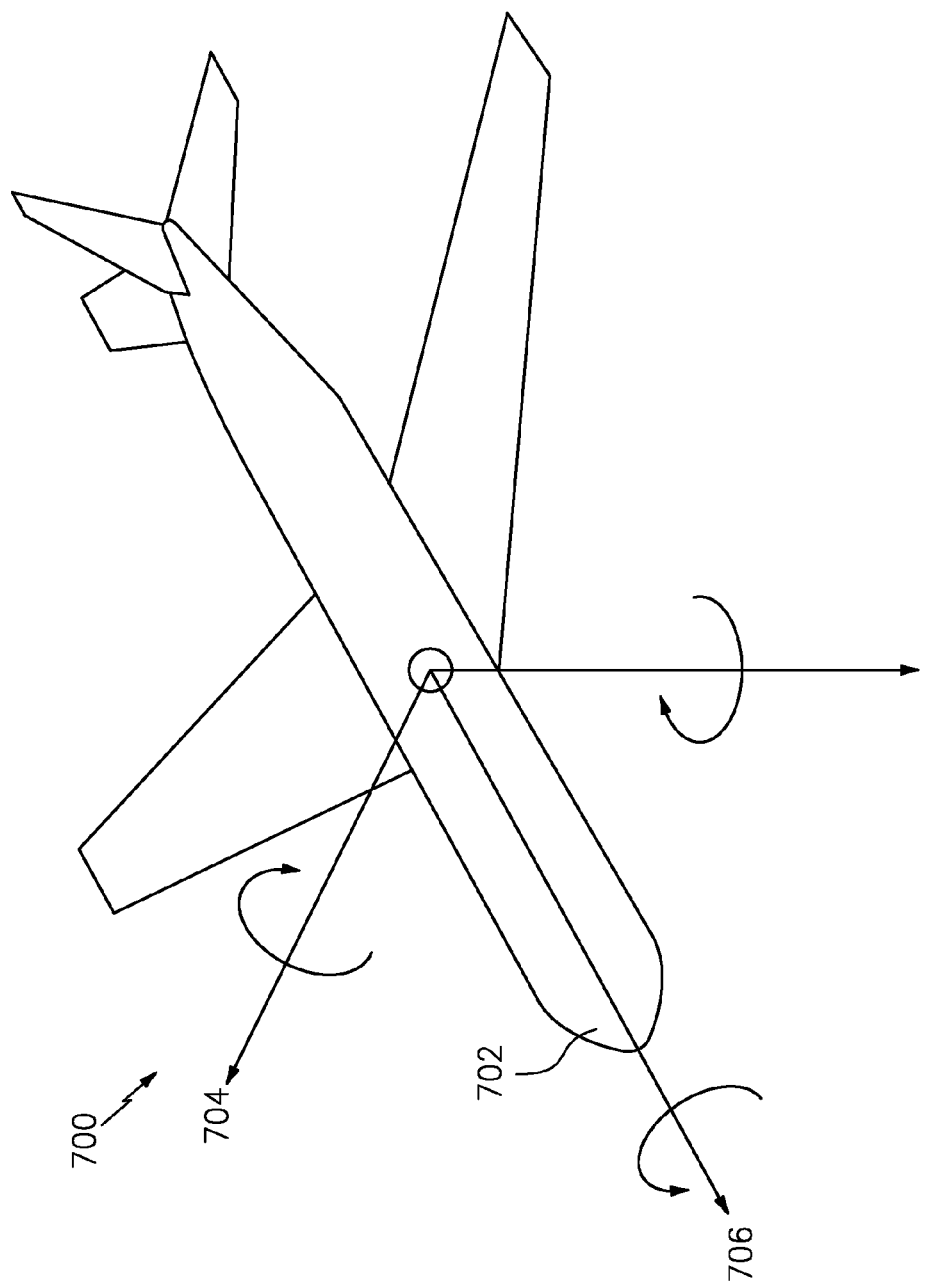
FIG. 7 is a schematic view of a vehicle in which the display mounting apparatus can be installed according to an embodiment.

FIG. 7 is a schematic view of a vehicle 700 in which the display mounting apparatus 100 can be installed according to an embodiment. The vehicle 700 is an example of an aircraft that includes a cockpit 702. The vehicle 700 may rotate about a pitch axis 704, a roll axis 706 and a yaw axis 708. Where the display mounting apparatus 100 is installed in front of a pilot position in the cockpit 702, the angular position 134 of the pivot support member 104 of FIG. 1 may be adjustable to enable inboard and outboard tilting of the pivot support member 104 at a plurality of discrete positions in substantial alignment with the pitch axis 704 of the vehicle 700. Where the display mounting apparatus 100 is installed beside a pilot position in the cockpit 702, the angular position 134 of the pivot support member 104 of FIG. 1 may be adjustable to substantially align with the roll axis 706 of the vehicle 700. Where the display mounting apparatus 100 is installed at an angle between a front and side position of a pilot position in the cockpit 702, adjustment of the angular position 134 of the pivot support member 104 of FIG. 1 may have a pitch axis 704 component and a roll axis 706 component relative to the vehicle 700.

A method of installing the display mounting apparatus 100 of FIGS. 1-6 in the vehicle 700 of FIG. 7 includes coupling the base mount member 102 of the display mounting apparatus 100 to a surface 122 of the vehicle 700. The surface 122 of the vehicle 700 may be in the cockpit 702 of an aircraft. As previously described, the base mount member 102 includes a pair of pivot attachment holes 110. An angular position 134 of the pivot support member 104 of the display mounting apparatus 100 can be adjusted. The pivot support member 104 includes an upper mounting surface 124 and a locking pin passage 126, where the pivot support member 104 is coupled to the base mount member 102 by a pivot pin 128 that passes through the pair of pivot attachment holes 110. The pivot pin 128 may be a ratcheting pivot pin that includes a locking handle 132 to adjust the angular position 134 of the pivot support member 104 by inboard or outboard tilting of the pivot support member 104 at a plurality of discrete positions.

A lower surface 140 of the upper mount member 106 of the display mounting apparatus 100 is positioned proximate the upper mounting surface 124 of the pivot support member 104 to align the pair of locking pin holes 142 in the upper mount member 106 with the locking pin passage 126 of the pivot support member 104. The locking pin 144 is engaged through the pair of locking pin holes 142 in the upper mount member 106 and through the locking pin passage 126 of the pivot support member 104. The angular position adjustment and engagement of the locking pin 144 can be performed in any order, and the angular position 134 may be adjusted before and after the locking pin 144 is engaged. The display mounting surface 138 of the upper mount member 106 can be secured to the EFB 136 for use by a flight crew of the aircraft, e.g., vehicle 700.

The plunger 162 of the locking pin 144 can be depressed to release the one or more locking balls 164 when an operator desires to remove the locking pin 144. Upon removal of the locking pin 144 from the upper mount member 106 and the pivot support member 104, the tether 156 retains the locking pin 144, and the EFB 136 can be freely moved about the cockpit 702 or removed entirely from the cockpit 702.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of installing a display mounting apparatus in a vehicle, the method comprising:
coupling a base mount member of the display mounting apparatus to a surface of the vehicle, the base mount member comprising a pair of pivot attachment holes;
adjusting an angular position of a pivot support member of the display mounting apparatus, the pivot support member comprising an upper mounting surface and a locking pin passage, the pivot support member coupled to the base mount member by a pivot pin that passes through the pair of pivot attachment holes, wherein the upper mounting surface of the pivot support member is substantially flat and cross shaped;
positioning a lower surface of an upper mount member of the display mounting apparatus proximate the upper mounting surface of the pivot support member to align a pair of locking pin holes in the upper mount member with the locking pin passage of the pivot support member; and
engaging a locking pin through the pair of locking pin holes in the upper mount member and through the locking pin passage of the pivot support member.

2. The method of claim 1, wherein the wherein the base mount member further comprises a pair of pivot coupling lobes and each of the pivot coupling lobes includes one of the pivot attachment holes.

3. The method of claim 2, wherein the base mount member comprises a first end and a second end opposite the first end, and the pair of pivot coupling lobes is offset closer to the first end than to the second end of the base mount member.

4. The method of claim 1, wherein the upper mount member further comprises a pair of locking pin engagement lobes and each of the locking pin engagement lobes includes one of the locking pin holes.

5. The method of claim 4, wherein the upper mount member comprises a first end and a second end opposite the first end, and the pair of locking pin engagement lobes is substantially centered between the first end and the second end of the upper mount member.

6. The method of claim 1, wherein the base mount member comprises a plurality of fastener holes to secure the display mounting apparatus to the surface of the vehicle using a plurality of fasteners.

7. The method of claim 1, wherein the surface of the vehicle is a cockpit of an aircraft, and a display mounting surface of the upper mount member is secured to an electronic flight bag.

8. A method of installing a display mounting apparatus in a vehicle, the method comprising:
coupling a base mount member of the display mounting apparatus to a surface of the vehicle, the base mount member comprising a pair of pivot attachment holes;
adjusting an angular position of a pivot support member of the display mounting apparatus, the pivot support member comprising an upper mounting surface and a locking pin passage, the pivot support member coupled to the base mount member by a pivot pin that passes through the pair of pivot attachment holes;
positioning a lower surface of an upper mount member of the display mounting apparatus proximate the upper mounting surface of the pivot support member to align a pair of locking pin holes in the upper mount member with the locking pin passage of the pivot support member; and
engaging a locking pin through the pair of locking pin holes in the upper mount member and through the locking pin passage of the pivot support member, wherein the locking pin is tethered to the base mount member at a tether attachment block.

9. The method of claim 8, wherein the tether attachment block is a pivot stop that limits rotation of the pivot support member.

10. The method of claim 8, wherein the locking pin comprises a T-handle and a plunger operable to articulate one or more locking balls in the locking pin.

11. The method of claim 8, wherein the upper mounting surface of the pivot support member is substantially flat and cross shaped.

12. The method of claim 8, wherein the wherein the base mount member further comprises a pair of pivot coupling lobes and each of the pivot coupling lobes includes one of the pivot attachment holes.

13. The method of claim 12, wherein the base mount member comprises a first end and a second end opposite the first end, and the pair of pivot coupling lobes is offset closer to the first end than to the second end of the base mount member.

14. The method of claim 8, wherein the upper mount member further comprises a pair of locking pin engagement lobes and each of the locking pin engagement lobes includes one of the locking pin holes.

15. The method of claim 14, wherein the upper mount member comprises a first end and a second end opposite the first end, and the pair of locking pin engagement lobes is substantially centered between the first end and the second end of the upper mount member.

16. The method of claim 8, wherein the base mount member comprises a plurality of fastener holes to secure the display mounting apparatus to the surface of the vehicle using a plurality of fasteners.

17. The method of claim 8, wherein the surface of the vehicle is a cockpit of an aircraft, and a display mounting surface of the upper mount member is secured to an electronic flight bag.

\* \* \* \* \*